United States Patent
Sakuma et al.

(10) Patent No.: US 8,282,765 B2
(45) Date of Patent: Oct. 9, 2012

(54) ADHESIVE SHEET

(75) Inventors: Toshihiko Sakuma, Warabi (JP); Kouji Tabata, Warabi (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 13/300,767

(22) Filed: Nov. 21, 2011

(65) Prior Publication Data

US 2012/0130336 A1   May 24, 2012

Related U.S. Application Data

(62) Division of application No. 11/886,899, filed as application No. PCT/JP2006/306051 on Mar. 20, 2006.

(30) Foreign Application Priority Data

Mar. 23, 2005 (JP) .................... 2005-084967

(51) Int. Cl.
| | |
|---|---|
| B29C 65/00 | (2006.01) |
| B32B 37/00 | (2006.01) |
| B32B 7/12 | (2006.01) |
| B32B 27/00 | (2006.01) |
| B32B 1/08 | (2006.01) |
| B32B 27/08 | (2006.01) |
| C08J 5/00 | (2006.01) |
| B29D 22/00 | (2006.01) |
| B29D 23/00 | (2006.01) |
| A61B 19/00 | (2006.01) |

(52) U.S. Cl. ............... 156/327; 156/307.1; 156/332; 428/35.4; 604/408

(58) Field of Classification Search ............ 156/307.1, 156/327, 332; 428/35.4; 604/408
See application file for complete search history.

(56) References Cited

U.S. PATENT DOCUMENTS

| | | | |
|---|---|---|---|
| 3,914,502 | A | 10/1975 | Hayashi et al. |
| 4,362,775 | A | 12/1982 | Yabe et al. |
| 4,857,396 | A | 8/1989 | Otonari et al. |
| 5,436,063 | A | 7/1995 | Follett et al. |
| 6,093,464 | A | 7/2000 | Tokunaga et al. |
| 6,221,978 | B1 | 4/2001 | Li et al. |
| 6,368,707 | B1 | 4/2002 | Kamiya et al. |
| 2002/0127414 | A1 | 9/2002 | Peiffer et al. |
| 2004/0013141 | A1 | 1/2004 | Suzuki |
| 2006/0000734 | A1 | 1/2006 | Ninomiya et al. |

FOREIGN PATENT DOCUMENTS

| | | |
|---|---|---|
| JP | 1-299883 A | 12/1989 |
| JP | 2-16159 A | 1/1990 |
| JP | 2003-171640 A | 6/2003 |
| JP | 2003-226849 A | 8/2003 |
| JP | 2004-231915 A | 8/2004 |
| WO | 84/02144 A1 | 6/1984 |

OTHER PUBLICATIONS

Shigefumi, JP 2000-319369 (Machine translation) (2000).

*Primary Examiner* — Michael Orlando

(74) *Attorney, Agent, or Firm* — Sughrue Mion, PLLC

(57) ABSTRACT

The present invention provides an adhesive sheet for attaching to a plasticized vinyl chloride resin article such as a blood bag made of a plasticized vinyl chloride resin, and having a center-line surface roughness Ra of 1.0 μm or higher, which includes a film substrate and a heat-sensitive adhesive layer formed on a backside surface of the film substrate, wherein the heat-sensitive adhesive layer is composed of a resin containing a crystalline polyester resin as a main component. The adhesive sheet of the present invention is excellent in adhesive property when the adhesive sheet is attached to the article made of a plasticized vinyl chloride resin. The adhesive strength of the adhesive sheet of the present invention is not decreased even after an autoclave treatment or storage at a low temperature.

9 Claims, No Drawings

ADHESIVE SHEET

CROSS REFERENCE TO RELATED APPLICATIONS

This is a divisional of application Ser. No. 11/886,899 filed Sep. 21, 2007, which is the National Stage of PCT/JP2006/306501 filed Mar. 20, 2006, the disclosures of which are incorporated herein by reference.

TECHNICAL FIELD

The present invention relates to an adhesive sheet and specifically an adhesive sheet having an excellent adhesive property, which can be attached to a plasticized vinyl chloride resin article, more particularly a blood bag made of a plasticized vinyl chloride resin.

BACKGROUND ART

As a blood bag in which blood is put, blood bags made of a plasticized vinyl chloride resin have widely been used to date. The blood bag is used with a label describing about information of blood being attached thereon.

After the attached label is subjected to an autoclave treatment or a steam sterilization at 120° C. for about 30 minutes, there is an instance where plasticizers contained in a plasticized vinyl chloride resin move into an adhesive layer to lower the adhesive property of the label, and lifting or peeling of the label takes place. When the label is peeled off from the blood bag, information about the blood is lost, causing a serious problem. Further, even in this case, if the label is merely peeled off, the blood bag that the label was peeled off may be scrapped, but in the case where a plurality of labels are peeled off without someone's knowledge for some reason, and the labels are wrongly attached to one of the other blood bags again, a blood bag with wrong blood information is used, resulting in a further fatal problem.

Moreover, as a label for a blood bag, there is used a label on which a trade name, volume, ingredient representation, and manufacture etc. are printed. In this field, a bar-code management system is established, the label that bar-code are printed is required. As a label for a blood bag, conventionally a label of paper as a substrate has been mainly used. However, when such label is in application to a blood bag, there have been problems that in treatment by a centrifugal separator to separate a normal blood cell component, a blood plasma component and the other component, due to lack of strength of the label substrate, the label cannot endure a centrifugal force and is broken, cracked, or through friction of the printed surface against the wall surface or the blood bag surface, information such as bar-code becomes too unclear to read by a bar-code reader. Therefore, there has increasingly desired a plastic film substrate being less influenced by moisture than a paper substrate, and resistant to rubbing and strong/tough. However, although a plastic film substrate has the superiority described above, it has defect that lifting or peeling occurs more easily than a paper substrate in an autoclave treatment or a steam sterilization treatment and a centrifugal separation treatment. Further, when a heat sealing label is based on a plastic film substrate of liner-less roll type, it has a defect that blocking occurs more easily than a paper substrate.

To solve these problems, there is proposed a label for a blood bag based on a substrate film which is a microporous plastic film with a matrix structure surrounding pores connecting each other so that gas can flow in said blood bag and flow out through a region labeled (see Japanese Patent No. 3404573). Lifting and peeling in an autoclave treatment can be suppressed, however, there has been a problem that it is difficult to obtain the label with excellent blocking resistance.

DISCLOSURE OF THE INVENTION

An object of the present invention is to provide, an adhesive sheet which has superior adhesive property when the adhesive sheet is attached to a plasticized vinyl chloride resin article, does not decrease strength even after an autoclave treatment or a storage at a low temperature, does not cause lifting or peeling and has excellent blocking resistance.

The present inventors have perfected the present invention by discovering, as a result of a diligent study carried out to solve the above-described problems, that the above-described problems can be solved by forming a heat-sensitive adhesive layer composed of a resin comprising a crystalline polyester resin as a main component, on a backside surface of the film substrate.

Thus, the present invention provides an adhesive sheet for attaching to a plasticized vinyl chloride resin article, which comprises a film substrate and a heat-sensitive adhesive layer formed on a backside surface of the film substrate, wherein the heat-sensitive adhesive layer is composed of a resin comprising a crystalline polyester resin as a main component.

The present invention provides the adhesive sheet as described above, wherein a content ratio of the crystalline polyester resin comprised in the resin composing the heat-sensitive adhesive layer is 50 to 100 percent by mass.

The present invention provides the adhesive sheet as described above, wherein the resin composing the heat-sensitive adhesive layer is composed of 50 to 100 percent by mass of the crystalline polyester resin and 50 to 0 percent by mass of an amorphous polyester resin.

Additionally, the present invention provides the adhesive sheet as described above, wherein a melting point of the crystalline polyester resin is 50 to 200° C.

Also, the present invention provides the adhesive sheet as described above, wherein a glass transition temperature of the amorphous polyester resin is 10 to 90° C.

Further, the present invention provides the adhesive sheet as described above, wherein the adhesive sheet is an adhesive sheet for attaching to a plasticized vinyl chloride resin article having a center-line surface roughness Ra of 1.0 μm or higher.

Furthermore, the present invention provides the adhesive sheet as described above, wherein the plasticized vinyl chloride resin article is an blood bag made of a plasticized vinyl chloride resin.

PREFERRED EMBODIMENTS FOR CARRYING OUT THE INVENTION

The film substrate in the present invention includes films or sheets of plastics of polyolefin resins such as polyethylene resin and polypropylene; polyester resins such as polybutylene terephthalate resin and polyethylene terephthalate resin; acetate resins; ABS resins; polystyrene resins; vinyl chloride resins and the like. Among them, films or sheets of vinyl chloride resins and polyester resins are preferable.

The film substrate may be formed in either a single layer or multiple layers having two or more layers. The film substrate can be not oriented, or can be oriented into uniaxial direction or biaxial direction such as longitudinal direction or cross direction. The thickness of the film substrate is not limited, but the thickness may usually be 10 to 250 μm, and is preferably 25 to 200 μm.

The flow direction breaking strength of the film substrate is preferably 10 N/15 mm to 220 N/15 mm and the cross direction breaking strength of the film substrate is preferably 10 N/15 mm to 220 N/15 mm. By controlling the breaking strength of the film substrate in the above range, the breaking of the film substrate becomes more difficult. Further the breaking strength of the film substrate becomes smaller than the adhesive strength of the heat-sensitive adhesive layer to the plasticized vinyl chloride resin article, therefore, if the adhesive sheet is forced to be peeled off from the plasticized vinyl chloride resin article against the adhesive strength, the film substrate is broken before the film substrate is peeled off from the plasticized vinyl chloride resin article. Accordingly, it becomes difficult to replace the adhesive sheet from the plasticized vinyl chloride resin article for attaching to the other plasticized vinyl chloride resin article intentionally. The breaking strength was measured pursuant to JIS K7127.

The film substrate can be colored or colorless transparent. A printing, a character printing or the like can be provided on the surface or the backside surface of the film substrate. Therefore, a heat-sensitive recording layer, a layer for receiving printing image which can provide a heat transfer printing, an inkjet printing, a laser printing or the like, a layer for improving printability, an layer for adhering ink easily or the like can be formed on the surface or the backside surface of the film substrate.

Also, in order to improve the adhesion strength (keying strength) of the film substrate to the heat-sensitive adhesive layer, a primer treatment, a corona discharge treatment, or the like can be provided on the backside surface of the film substrate composing the heat-sensitive adhesive layer.

In the present invention, the heat-sensitive adhesive layer is composed of a resin comprising a crystalline polyester resin as a main component.

The crystalline polyester resin has a heat of melting crystal of 5 to 50 J/g in measuring by a differential scanning calorimeter. When the heat of melting crystal is low, the crystalline polyester resin becomes nearly amorphous, the resin strength becomes lower, the adhesive strength decreases, and also, the blocking resistance is inferior. When the heat of melting crystal is high, the crystallization rate becomes faster, the open time becomes shorter, and the crystal shrinking becomes larger, so that the adhesive strength is decreased. The heat of melting crystal is preferably 10 to 45 J/g, and more preferably 15 to 40 J/g.

The crystalline polyester resin has a melting point of preferably 50 to 200° C., and more preferably 70 to 150° C. The crystalline polyester resin has a glass transition temperature of preferably −30 to 70° C., and more preferably −20 to 50° C.

The content ratio of the crystalline polyester resin comprised in the resin composing the heat-sensitive adhesive layer is preferably 50 to 100 percent by mass, more preferably 60 to 100 percent by mass, furthermore preferably 70 to 100 percent by mass and most preferably 80 to 100 percent by mass.

The resin composing the heat-sensitive adhesive layer can contain the other resins other than the crystalline polyester resin. The other resins include various resins, but preferably amorphous polyester resins.

The amorphous polyester resin has excellent wettability and excellent followability to the surface of the article when the adhesive sheet is attached to the plasticized vinyl chloride resin article. In particular, when the surface of the article is rough, the amorphous polyester resin has excellent wettability and excellent followability of the adhesive sheet to the surface of the article.

The amorphous polyester resin has a glass transition temperature of preferably 10 to 90° C., and more preferably 30 to 80° C. When the glass transition temperature of the amorphous polyester resin is less than 10° C., the blocking resistance trends to decrease easily. When the glass transition temperature of the amorphous polyester resin is more than 90° C., it takes long time to melt, and therefore, there is an instance that the heat sealing property becomes worse.

The content ratio of the amorphous polyester resin comprised in the resin composing the heat-sensitive adhesive layer is preferably 50 to 0 percent by mass, more preferably 40 to 0 percent by mass, furthermore preferably 30 to 0 percent by mass and most preferably 20 to 0 percent by mass. When the amorphous polyester resin is comprised in the resin composing the heat-sensitive adhesive layer, the lower limit value of the content is preferably not less than 0.1 percent by mass, more preferably not less than 0.5 percent by mass, and most preferably not less than 1 percent by mass.

The polyester resin as described above can be produced by usually polymerizing a polyol and a polyhydric carboxylic acid.

The polyol includes diethylene glycol, dipropylene glycol, polyether polyols such as triethylene glycol and polyethylene glycol, polyester polyols, ethylene glycol, propylene glycol, 1,4-butanediol, 1,3-pentanediol, neopentyl glycol, 1,6-hexanediol, cyclohexanediol, 2,2,4-trimethyl-1,3-pentanediol, glycerol, glycerol monoallyl ether, trimethylol ethane, trimethylol propane, and pentaerythritol. The polyol can be utilized singly or in combination of 2 or more members.

The polyhydric carboxylic acid includes malonic acid, phthalic acid, terephthalic acid, isophthalic acid, tetrahydro phathalic acid, methyl tetrahydro phthalic acid, hexahydro phthalic acid, methyl hexahydro phthalic acid, succinic acid, glutaric acid, hexachloro endomethylene tetrahydrophthalic acid, endomethylene tetrahydrophthalic acid, endomethylene hexahydrophthalic acid, adipic acid, sebasic acid, azelaic acid, dimmer acid, decadicarboxylic acid, cycrohexane-dicarboxylic acid, trimellitic acid, pyromellitic acid, trimesic acid, and cycropentane dicarboxylic acid. The polyhydric carboxylic acid can be utilized singly or in combination of 2 or more members.

The combination of the polyol and the polyhydric carboxylic acid can be properly selected to produce the crystalline polyester resin or the amorphous polyester resins and to control the glass transition temperature to be in the range described above.

The polyester resin can be utilized singly or in combination of 2 or more members.

The heat sensitive adhesive layer is preferably cured by adding a crosslinking agent. By crosslinking the crosslinking agent, the heat sensitive adhesive layer can have strong adhesive strength, strong cohesive force and more excellent blocking resistance. The crosslinking agent includes polyisocyanate compounds, epoxy compounds, aluminium chelate compounds and ethylene imine compounds. Preferable crosslinking agent is polyisocyanate compounds. Most preferable crosslinking agent includes aliphatic or alicyclic polyisocyanate compounds in view of the weather resistance. The polyisocyanate compounds include polyisocyanate compounds having two or more isocyanate groups per one molecule, and, for example, various polyisocyanate compounds such as di-isocyanate compounds, tri-isocyanate compounds, tetra-isocyanate compounds, penta-isocyanate compounds and hexa-isocyanate compounds.

Examples of the polyisocyanate compounds include aromatic polyisocyanates such as tolylene diisocyanate, xylylene di-isocyanate, diphenylmethane di-isocyanate, biphenyl di-isocyanate, 3,3'-dimethyl-4,4'-biphenylene di-isocyanate, methylene-bis(phenyl)socyanate), isophorone di-isocyanate, and alicyclic polyisocyantes such as hydrogenated tolylene diisocyanate, hydrogenated xylylene di-isocyanate and hydrogenated diphenylmethane di-isocyanate, and aliphatic polyisocyanates such as 1,4-tetra-methylene di-isocyanate, hexamethylene diisocyanate and 2,2,4-trimethyl-hexamethylene diisocyanate.

When crosslinking agent is used, a crosslinking promoting agent is preferably added.

The crosslinking promoting agent includes, for example, amine compounds such as triethylamine and tetramethylbutanediamine, and metal compounds such as stannous chloride, dimethyl dichloro tin, trimethyl tin hydroxide, di-n-butyl tin dilaurate, dibutyl tin diacetate, dibutyl tin sulfide, ferric chloride, ferric acetylacetate, cobalt naphthenate, bismuth nitrate, lead oleate and amtimony trichloride.

When the crosslinking agent is used, the used polyester resin has preferably a hydroxyl value of 1 or more mgKOH/g. The upper limit of the hydroxyl value of the polyester resin can be selected properly and is preferably not more than 50 mgKOH/g, and more preferably not more than 20 mgKOH/g. The most preferable range of the hydroxyl value of the polyester resin is 2 to 10 mgKOH/g. Among the polyester resins, the crystalline polyester resin has most preferably the hydroxyl value of the range described above.

The adding amount of the crosslinking agente is preferably 0.01 to 10 parts by mass, and more preferably 0.1 to 5 parts by mass to 100 parts by mass of the polyester resin.

Additionally, one or more additives can be contained in the heat-sensitive adhesive layer, according to needs. The additives include fillers, dyes, pigments, antioxidants and ultraviolet absorbers. The fillers include inorganic fillers such as titanium dioxide, silica, calcium carbonate, barium sulfate and talc, and organic fillers such as starch. The antioxidants include anilide antioxidants, phenol antioxidants, phosphite antioxidants, and thioester antioxidants. The ultraviolet absorbers include benzophenone ultraviolet absorbers and benzotriazole ultraviolet absorbers.

The heat-sensitive adhesive layer can be formed by applying a heat-sensitive adhesive on the backside surface of the film substrate, which is a mixture prepared by mixing the components described above, and optionally mixing a diluent additionally to control a proper viscosity, and optionally drying and/or crosslinking, or can be formed by applying the heat-sensitive adhesive on a surface of a release base, optionally drying and/or crosslinking, and then laminating the backside surface of the film substrate on the surface of the applied layer.

The diluents contained in the heat-sensitive adhesive or added later, include aromatic hydrocarbons such as benzene, toluene and xylene; aliphatic hydrocarbons such as hexane, heptane, octane, nonane and decane; ketones such as methyl ethyl ketone, diethyl ketone and diisopropyl ketone. The formulating amount of the diluent can be selected properly to control the demanded viscosity.

The thickness of the heat-sensitive adhesive layer is not limited particularly, but usually 5 to 40 µm, and preferably 10 to 25 µm.

In the present invention, a printing or a character printing can be provided on the surface of the heat-sensitive adhesive layer.

And, the surface of the heat-sensitive adhesive layer can be covered with a release liner.

The release liner is made of a support base having release property on at least one surface. The support base can have the surface having release property obtained by applying a release agent, or the surface without applying a release agent.

The support base of the release liner includes, for example, papers, synthetic papers and plastic films. The papers include, for example, glassine paper and polyethylene laminated paper. The plastic films include, for example, films of plastics such as polyolefine resin of polyethylene resin, polypropylene resin or the like, polyester resin of polybutylene terephthalate resin, polyethylene terephthalate resin or the like, acetate resin, polystyrene resin and vinyl chloride resin. The proper examples of the release liner having the surface without applying a release agent, include polyolefin resin film such as polyethylene resin film, polypropylene resin film and the like, and films obtained by laminating the polyolefin resin film on the paper or the other films.

The thickness of the support base of the release liner is not limited particularly, and the thickness is generally 15 to 300 µm.

The release agent used in the release liner includes a silicone-based resin, an alkyd resin, a fluorine-based resin and a long-chain alkyl based resin.

The thickness of the adhesive sheet laminated with the film substrate, the heat-sensitive adhesive layer and the release liner, is preferably a thickness which can introduce into a printer or the like, and generally a level of about 50 to 300 µm.

The adhesive sheet of the present invention can be a flat sheet, or a sheet wound in a roll shape.

The adhesive sheet of the present invention can be used in various uses for attaching the heat-sensitive adhesive layer. The adhesive sheet is useful particularly when an adherend is an article made of a plasticized vinyl chloride resin. The adhesive sheet of the present invention does not cause lifting or peeling, even if a sterilization treatment is conducted after attaching to a blood bag made of a plasticized vinyl chloride resin. Therefore, the adhesive sheet of the present invention is particularly useful in the use as an indication label or a management label of the blood bag. The adhesive sheet of the present invention can particularly operate effectively when the adherend made of the plasticized vinyl chloride resin has a rough surface. The center-line surface roughness of the adherend made of the plasticized vinyl chloride resin is preferably 1 µm or more, and more preferably 1.5 µm or more.

The center-line surface roughness of the adherend made of the plasticized vinyl chloride resin is not limited particularly, but it is preferably not more than 20 µm, and more preferably not more than 10 µm.

The adhesive sheet for attaching to the blood bag is printed on the surface of the film substrate with the information such as a blood type and collecting date and time of blood. The attaching of the adhesive sheet to the blood bag is conducted before charging the blood into the blood bag.

The attaching of the adhesive sheet to the adherend, is generally conducted by superimposing the heat-sensitive adhesive layer directly on the surface of the adherend and then heating and pressing. The heating temperature is preferably 80 to 160° C. in general, more preferably 100 to 150° C. and most preferably 120 to 140° C. The pressure for the pressing is generally 0.5 to 10 kg/cm$^2$. The time for the pressing is preferably 0.1 to 5 seconds and more preferably 0.5 to 3 seconds.

The adhesive sheet of the present invention does not decrease in the strength even after an autoclave treatment or a storage at a low temperature, does not cause lifting or peeling, has excellent adhesive property for the long time, and is excellent in blocking resistance. The adhesive sheet of the present invention is extremely excellent in practicability.

EXAMPLES

In the following, the present invention is explained in more detail by Examples. Further, the present invention is not limited at all by these Examples.

The adhesive strength measuring test in the Examples was conducted according to the following methods.

(1) Adhesive Strength Measuring Test

On the surface having a center-line surface roughness Ra of 6.3 μm of a blood bag made of a plasticized vinyl chloride resin, a surface of a heat-sensitive adhesive layer of an adhesive sheet was attached by heat sealing at a temperature of 130° C. for a pressing time of 2 seconds under a pressure of 3 kg/cm$^3$ with a heat sealer (manufactured by TESTER SANGYO Co. LTD., trade name "HEAT SEAL TESTER TP-701"). The adhesive sheets attached to the blood bag were respectively peeled off at a pull speed of 300 mm/min by a 180° peeling method, at a condition after 30 minutes from the heat sealing (Condition 1) and at a condition after autoclave treatment for 40 minutes with a high pressure sterilization machine (manufactured by HIRAYAMA MANUFACTURING CORPORATION, trade name "AUTO HIGH PRESSURE STERILIZATION MACHINE HA-24 TYPE") after 30 minutes from the heat sealing (Condition 2). The peeled states of the adhesive sheet and the blood bag in condition 1 or condition 2 were observed by visual. The peeled states were evaluated on the basis of the following standards.

⊚: The blood bag made of plasticized vinyl chloride resin or the film substrate of the adhesive sheet was broken.

○: A part of the blood bag made of plasticized vinyl chloride resin or a part of the film substrate of the adhesive sheet was broken.

X: The blood bag made of plasticized vinyl chloride resin or the film substrate of the adhesive sheet was not broken, and the adhesive sheet was peeled off.

(2) Autoclave Applicability

On the surface having a center-line surface roughness Ra of 6.3 μm of a blood bag made of a plasticized vinyl chloride resin, a surface of a heat-sensitive adhesive layer of an adhesive sheet was attached by heat sealing at a temperature of 130° C. for a pressing time of 2 seconds under a pressure of 3 kg/cm$^3$ with a heat sealer (manufactured by TESTER SANGYO Co. LTD., trade name "HEAT SEAL TESTER TP-701"). After 30 minutes from the heat sealing, an autoclave treatment was conducted for 40 minutes with a high pressure sterilization treatment machine (manufactured by HIRAYAMA MANUFACTURING CORPORATION, trade name "AUTO HIGH PRESSURE STERILIZATION MACHINE"). Lifting or peeling of the adhesive sheet was observed by visual. The results were evaluated on the basis of the following standards.

○: Lifting or peeling was not caused in the adhesive sheet.

X: Lifting or peeling was caused in the adhesive sheet.

(3) Blocking Test

The heat-sensitive adhesive layer of the adhesive sheet was superposed on the backside surface of the heat-sensitive adhesive layer of the adhesive sheet. The superposed adhesive sheet was left for 120 hours in the environment of 60° C. with application of a load of 20 g/cm$^2$. And then, the backside surface of the adhesive sheet was observed by visual whether there is blocking or not. The results were evaluated on the basis of the following standards.

⊚: The adhesive sheet was peeled off without resistance.

○: The adhesive sheet was peeled off with making some noise.

Δ: The heat sealing agent or a part of the film substrate was left on the backside surface of the heat-sensitive adhesive layer of the adhesive sheet.

X: The film substrate was broken.

Example 1

A solution obtained by mixing 100 parts by mass (as solid component) of a crystalline polyester resin having a glass transition temperature of 10° C. and a melting point of 110° C. (manufactured by Nippon Synthetic Chemical Industry Co. Ltd., trade name "POLYESTAR SP-180 S20TM", a heat of melting crystal of 26.99 J/g measured by a differential scanning calorimeter) and 100 parts by mass of a diluent which is toluene, was applied on a backside surface (non-treatment surface) of a film substrate composed of a polyester film sheet having a layer for adhering ink easily on the surface (produced by TOYOBO CO., LTD., trade name "CRISPER K2311", a thickness of 50 μm, flow direction breaking strength of 94 N/15 mm, cross direction breaking strength of 118 N/15 mm) in an amount to form a heat-sensitive adhesive layer having a dried thickness of 12 μm and dried. And then, on the surface of the formed heat-sensitive adhesive layer, a release liner composed of a polyethylene terephthalate film having a silicone resin layer on one surface (manufactured by LINTEC Corporation, trade name "SP-PET38CL", a thickness of 38 μm) was laminated to make an adhesive sheet.

On the surface of the film substrate of the adhesive sheet, blood information was printed. Next, the printed adhesive sheet was cut in a label size and then the release liner was peeled off. The obtained adhesive sheet was heat sealed at a temperature of 130° C. for a pressing time of 2 seconds under a pressure of 3 kg/cm$^3$ on the surface having a center-line surface roughness Ra of 6.3 μm of a blood bag made of a plasticized vinyl chloride resin to attach. When the adhesive sheet was attached, peeling or slipping was not observed.

After the adhesive sheet was left for 3 months in the state, the adhesive condition of the adhesive sheet was observed by visual. Lifting or peeling was not observed. The adhesive strength measuring test, the autoclave applicability and the blocking test were conducted. The results are shown in Table 1.

Example 2

An adhesive sheet was prepared in the same manner as Example 1 except that a solution obtained by mixing 100 parts by mass (as solid component) of a crystalline polyester resin having a glass transition temperature of 10° C. and a melting point of 110° C. (manufactured by Nippon Synthetic Chemical Industry Co. Ltd., trade name "POLYESTAR SP-180 S20TM") and 100 parts by mass of a diluent which is toluene, was applied on a backside surface (non-treatment surface) of the film substrate and was dried to form a heat-sensitive adhesive layer.

The obtained adhesive sheet was heat sealed at a temperature of 130° C. for a pressing time of 2 seconds under a pressure of 3 kg/cm$^3$ on the surface having a center-line surface roughness Ra of 2 μm of a blood bag made of a plasticized vinyl chloride resin to attach. When the adhesive sheet was attached, peeling or moving was not observed.

After the adhesive sheet was left for 3 months in the state, the adhesive condition of the adhesive sheet was observed by visual. Lifting or peeling was not observed. The adhesive strength measuring test, the autoclave applicability and the blocking test were conducted. The results are shown in Table 1.

Example 3

An adhesive sheet was prepared in the same manner as Example 1 except that a solution obtained by mixing 90 parts by mass (as solid component) of a crystalline polyester resin having a glass transition temperature of 10° C. and a melting point of 110° C. (manufactured by Nippon Synthetic Chemical Industry Co. Ltd., trade name "POLYESTAR SP-180 S20TM"), 10 parts by mass (as solid component) of an amorphous polyester resin having a glass transition temperature of 65° C. (manufactured by Nippon Synthetic Chemical Industry Co. Ltd., trade name "POLYESTAR TP-235 S20TM") and 100 parts by mass of a diluent which is toluene, was applied on a backside surface (non-treatment surface) of the film substrate and was dried to form a heat-sensitive adhesive layer.

The obtained adhesive sheet was heat sealed at a temperature of 130° C. for a pressing time of 2 seconds under a pressure of 3 kg/cm$^3$ on the surface having a center-line surface roughness Ra of 2 μm of a blood bag made of a plasticized vinyl chloride resin to attach. When the adhesive sheet was attached, peeling or moving was not observed.

After the adhesive sheet was left for 3 months in the state, the adhesive condition of the adhesive sheet was observed by visual. Lifting or peeling was not observed. The adhesive strength measuring test, the autoclave applicability and the blocking test were conducted. The results are shown in Table 1.

Example 4

An adhesive sheet was prepared in the same manner as Example 1 except that a solution obtained by mixing 60 parts by mass (as solid component) of a crystalline polyester resin having a glass transition temperature of 10° C. and a melting point of 110° C. (manufactured by Nippon Synthetic Chemical Industry Co. Ltd., trade name "POLYESTAR SP-180 S20TM"), 40 parts by mass (as solid component) of an amorphous polyester resin having a glass transition temperature of 65° C. (manufactured by Nippon Synthetic Chemical Industry Co. Ltd., trade name "POLYESTAR TP-235 S20TM") and 100 parts by mass of a diluent which is toluene, was applied on a backside surface (non-treatment surface) of the film substrate and was dried to form a heat-sensitive adhesive layer.

The obtained adhesive sheet was heat sealed at a temperature of 130° C. for a pressing time of 2 seconds under a pressure of 3 kg/cm$^3$ on the surface having a center-line surface roughness Ra of 2 μm of a blood bag made of a plasticized vinyl chloride resin to attach. When the adhesive sheet was attached, peeling or moving was not observed.

After the adhesive sheet was left for 3 months in the state, the adhesive condition of the adhesive sheet was observed by visual. Lifting or peeling was not observed. The adhesive strength measuring test, the autoclave applicability and the blocking test were conducted. The results are shown in Table 1.

Example 5

An adhesive sheet was prepared in the same manner as Example 1 except that a solution obtained by mixing 90 parts by mass (as solid component) of a crystalline polyester resin having a glass transition temperature of 10° C. and a melting point of 110° C. (manufactured by Nippon Synthetic Chemical Industry Co. Ltd., trade name "POLYESTAR SP-180 S20TM"), 10 parts by mass (as solid component) of an amorphous polyester resin having a glass transition temperature of 40° C. (manufactured by Nippon Synthetic Chemical Industry Co. Ltd., trade name "POLYESTAR TP-219 S30TO") and 100 parts by mass of a diluent which is toluene, was applied on a backside surface (non-treatment surface) of the film substrate and was dried to form a heat-sensitive adhesive layer.

The obtained adhesive sheet was heat sealed at a temperature of 130° C. for a pressing time of 2 seconds under a pressure of 3 kg/cm$^3$ on the surface having a center-line surface roughness Ra of 2 μm of a blood bag made of a plasticized vinyl chloride resin to attach. When the adhesive sheet was attached, peeling or moving was not observed.

After the adhesive sheet was left for 3 months in the state, the adhesive condition of the adhesive sheet was observed by visual. Lifting or peeling was not observed. The adhesive strength measuring test, the autoclave applicability and the blocking test were conducted. The results are shown in Table 1.

Example 6

An adhesive sheet was prepared in the same manner as Example 1 except that a solution obtained by mixing 100 parts by mass (as solid component) of a crystalline polyester resin having a glass transition temperature of 10° C. and a melting point of 110° C. (manufactured by Nippon Synthetic Chemical Industry Co. Ltd., trade name "POLYESTAR SP-180 S20TM", a hydroxyl value of 8 mgKOH/g), 0.5 parts by mass (as solid component) of a crosslinking agent (aromatic polyisocyanate compound, manufactured by TOYO INK MFG. Co. Ltd., trade name "BHS8515") and 100 parts by mass of a diluent which is toluene, was applied on a backside surface (non-treatment surface) of the film substrate and was dried to form a heat-sensitive adhesive layer.

The obtained adhesive sheet was heat sealed at a temperature of 130 for a pressing time of 2 seconds under a pressure of 3 kg/cm$^3$ on the surface having a center-line surface roughness Ra of 2 μm of a blood bag made of a plasticized vinyl chloride resin to attach. When the adhesive sheet was attached, peeling or moving was not observed.

After the adhesive sheet was left for 3 months in the state, the adhesive condition of the adhesive sheet was observed by visual. Lifting or peeling was not observed. The adhesive strength measuring test, the autoclave applicability and the blocking test were conducted. The results are shown in Table 1.

Comparative Example 1

An adhesive sheet was prepared in the same manner as Example 1 except that an ethylene-vinyl acetate copolymer resin (manufactured by TOYO-MORTON Co. Ltd., trade name "AD-1790-15") was used instead of a crystalline polyester resin having a glass transition temperature of 10° C. and a melting point of 110° C.

The obtained adhesive sheet was attached on the surface having a center-line surface roughness Ra of 6.3 μm of a blood bag made of a plasticized vinyl chloride resin in the same manner as Example 1.

The adhesive strength measuring test, the autoclave applicability and the blocking test were conducted. The results are shown in Table 1.

Comparative Example 2

An adhesive sheet was prepared in the same manner as Example 1 except that an amorphous polyester resin having a glass transition temperature of 65° C. (manufactured by Nippon Synthetic Chemical Industry Co. Ltd., trade name "POLYESTAR TP-235 S20TM") was used instead of a crystalline polyester resin having a glass transition temperature of 10° C. and a melting point of 110° C.

The obtained adhesive sheet was attached on the surface having a center-line surface roughness Ra of 6.3 μm of a blood bag made of a plasticized vinyl chloride resin in the same manner as Example 1.

The adhesive strength measuring test, the autoclave applicability and the blocking test were conducted. The results are shown in Table 1.

Comparative Example 3

An adhesive sheet was prepared in the same manner as Example 1 except that an amorphous polyester resin having a glass transition temperature of 65° C. (manufactured by Nippon Synthetic Chemical Industry Co. Ltd., trade name "POLYESTAR TP-235 S20TM") was used instead of a crystalline polyester resin having a glass transition temperature of 10° C. and a melting point of 110° C.

The obtained adhesive sheet was attached on the surface having a center-line surface roughness Ra of 2 μm of a blood bag made of a plasticized vinyl chloride resin in the same manner as Example 1.

The adhesive strength measuring test, the autoclave applicability and the blocking test were conducted. The results are shown in Table 1.

Comparative Example 4

An adhesive sheet was prepared in the same manner as Example 1 except that an amorphous polyester resin having a glass transition temperature of 65° C. (manufactured by Nippon Synthetic Chemical Industry Co. Ltd., trade name "POLYESTAR TP-235 S20TM") was used instead of a crystalline polyester resin having a glass transition temperature of 10° C. and a melting point of 110° C.

The obtained adhesive sheet was attached on the surface having a center-line surface roughness Ra of 0.8 μm of a blood bag made of a plasticized vinyl chloride resin in the same manner as Example 1.

The adhesive strength measuring test, the autoclave applicability and the blocking test were conducted. The results are shown in Table 1.

Comparative Example 5

An adhesive sheet was prepared in the same manner as Example 1 except that a solution obtained by mixing 10 parts by mass (as solid component) of a crystalline polyester resin having a glass transition temperature of 10° C. and a melting point of 110° C. (manufactured by Nippon Synthetic Chemical Industry Co. Ltd., trade name "POLYESTAR SP-180 S20TM"), 90 parts by mass (as solid component) of an amorphous polyester resin having a glass transition temperature of 65° C. (manufactured by Nippon Synthetic Chemical Industry Co. Ltd., trade name "POLYESTAR TP-235 S20TM") and 100 parts by mass of a diluent which is toluene, was applied on a backside surface (non-treatment surface) of the film substrate and was dried to form a heat-sensitive adhesive layer.

The obtained adhesive sheet was attached on the surface having a center-line surface roughness Ra of 6.3 μm of a blood bag made of a plasticized vinyl chloride resin in the same manner as Example 1.

The adhesive strength measuring test, the autoclave applicability and the blocking test were conducted. The results are shown in Table 1.

TABLE 1

| | Adhesive property | | Autoclrave applicability | Blocking test |
|---|---|---|---|---|
| | Condition 1 | Condition 2 | | |
| Example 1 | ◎ | ◎ | ○ | ○ |
| Example 2 | ◎ | ◎ | ○ | ○ |
| Example 3 | ◎ | ◎ | ○ | ○ |
| Example 4 | ◎ | ○ | ○ | ○ |
| Example 5 | ◎ | ◎ | ○ | ○ |
| Example 6 | ◎ | ◎ | ○ | ◎ |
| Comparative Example 1 | X | X | X | ○ |
| Comparative Example 2 | ○ | X | X | X |
| Comparative Example 3 | ○ | X | X | X |
| Comparative Example 4 | ○ | ○ | ○ | X |
| Comparative Example 5 | ○ | ○ | ○ | Δ |

What is claimed is:

1. A method for using an adhesive sheet which comprises attaching an adhesive sheet to a surface of a plasticized vinyl chloride resin article, wherein the adhesive sheet is an adhesive sheet for attaching to a plasticized vinyl chloride resin article, which comprises a film substrate having a thickness of 25 to 200 μm and having a flow direction breaking strength of 10 N/15 mm to 220 N/15 mm and a cross direction breaking strength of 10 N/15 mm to 220 N/15 mm and a heat-sensitive adhesive layer having a thickness of 10 to 25 μm formed on a backside surface of the film substrate, wherein the heat-sensitive adhesive layer is composed of a resin comprising a crystalline polyester resin having a heat of melting crystal of 5 to 50 J/g in measuring by a differential scanning calorimeter as a main component, wherein a content ratio of the crystalline polyester resin comprised in the resin composing the heat-sensitive adhesive layer is 50 to 100 percent by mass, a melting point of the crystalline polyester resin is 50 to 200° C., the film substrate is composed of a resin selected from the group consisting of polybutylene terephthalate resin, polyethylene terephthalate resin, acetate resins, polystyrene resins, and vinyl chloride resins, the crystalline polyester resin is produced from a combination of a polyol and a polyhydric carboxylic acid, and the polyhydric carboxylic acid is selected from the group consisting of malonic acid, phthalic acid, terephthalic acid, isophthalic acid, tetrahydro phthalic acid, methyl tetrahydro phthalic acid, hexahydro phthalic acid, methyl hexahydro phthalic acid, succinic acid, glutaric acid, hexachloro endomethylene tetrahydrophthalic acid, endomethylene tetrahydrophthalic acid, endomethylene hexahydrophthalic acid, adipic acid, sebasic acid, azelaic acid, dimer acid, decadicarboxylic acid, cyclopentane dicarboxylic acid, and mixtures thereof.

2. A method as claimed in claim 1, wherein the resin composing the heat-sensitive adhesive layer is composed of 50 to 100 percent by mass of the crystalline polyester resin and 50 to 0 percent by mass of an amorphous polyester resin, and a glass transition temperature of the amorphous polyester resin is 10 to 90° C.

3. A method as claimed in claim 1, wherein the heat sensitive adhesive layer is cured by adding at least one crosslinking agent selected from the group consisting of a polyisocyanate compound, an epoxy compound, an aluminum chelate compound and an ethylene imine compound to the crystalline polyester resin.

4. A method as claimed in claim 3, wherein the crosslinking agent is selected from the group consisting of an aliphatic polyisocyanate compound and an alicyclic polyisocyanate compound.

5. A method as claimed in claim 3, wherein the crystalline polyester resin has a hydroxyl value of 1 to 50 mgKOH/g.

6. The method for using an adhesive sheet as claimed in claim 1, wherein the adhesive sheet can not be replaced from the plasticized vinyl chloride resin article for attaching to the other plasticized vinyl chloride resin article.

7. The method for using an adhesive sheet as claimed in claim 1, wherein the film substrate of the adhesive sheet is broken
before the film substrate is peeled off from the plasticized vinyl chloride resin article, if the adhesive sheet is forced to be peeled off from the plasticized vinyl chloride resin article.

8. The method for using an adhesive sheet as claimed in claim 6, wherein the plasticized vinyl chloride resin article is a blood bag made of a plasticized vinyl chloride resin.

9. The method for using an adhesive sheet as claimed in claim 7, wherein the plasticized vinyl chloride resin article is a blood bag made of a plasticized vinyl chloride resin.

* * * * *